May 14, 1957 — R. A. PETERS — 2,791,925
DEFORMABLE ELEMENT, HOLDER AND DISPENSER THEREFOR
Filed Dec. 6, 1954
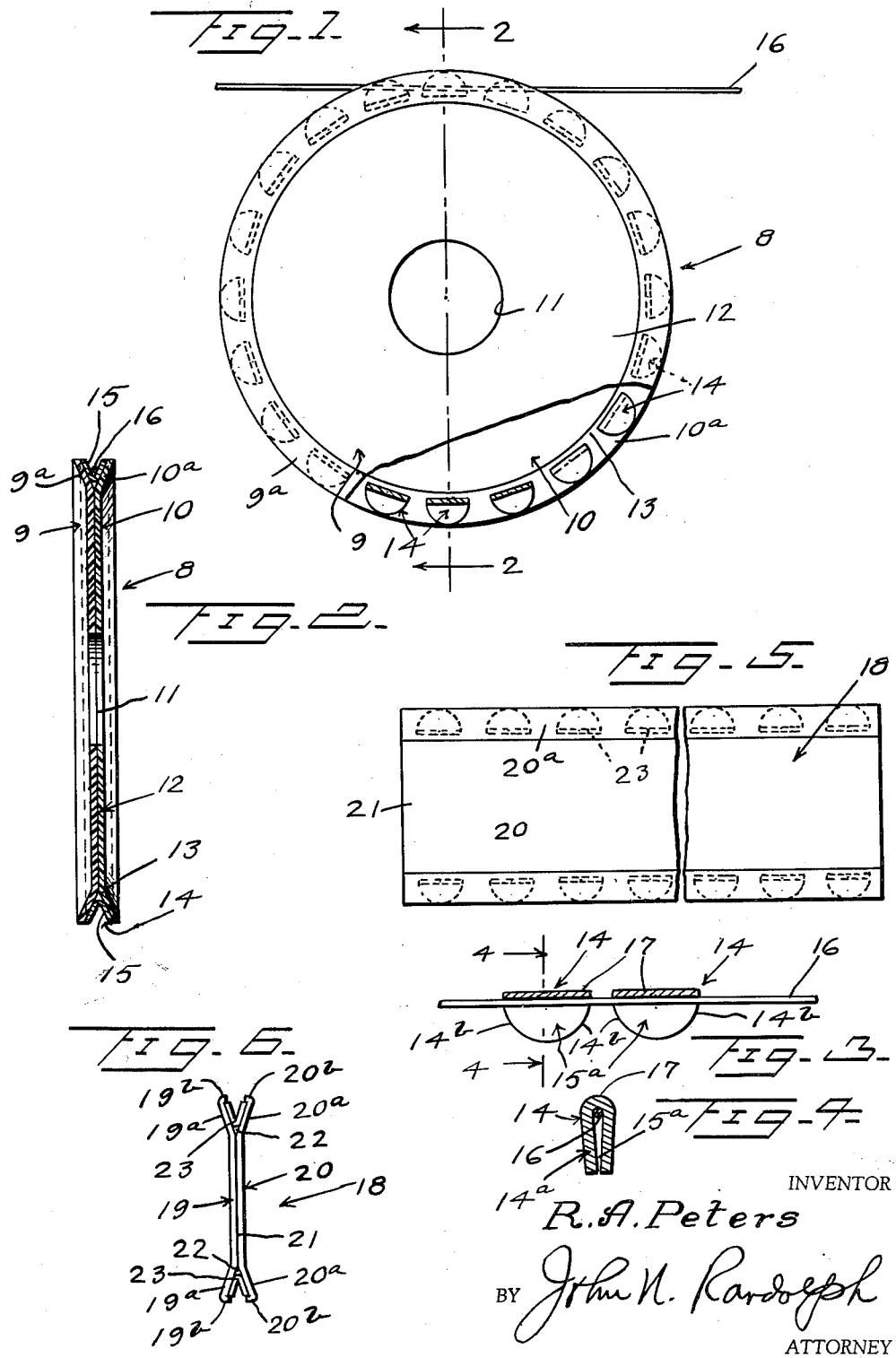
INVENTOR
R. A. Peters
BY John N. Randolph
ATTORNEY

2,791,925

Patented May 14, 1957

2,791,925

DEFORMABLE ELEMENT, HOLDER AND DISPENSER THEREFOR

Ray A. Peters, San Gabriel, Calif.

Application December 6, 1954, Serial No. 473,193

3 Claims. (Cl. 81—15)

This invention relates to a novel form of holder and dispenser for deformable elements and to a novel deformable element capable of use therewith.

More particularly, it is a primary object of the present invention to provide a holder and dispenser primarily adapted for use with fishing sinkers of the type which are clamped by being deformed to a fishing line or leader, to provide a convenient means for holding a plurality of such deformable elements and for effecting a deformation of selected elements while contained in the holder to thereby clamp the deformed elements to a strand-like element such as a fishing leader or line, and after which the deformed element or elements may be readily removed from the holder and dispenser.

Still a further object of the invention is to provide a novel deformable type fishing sinker which is so constructed that a substantial portion thereof will hang beneath a leader or line to which the sinker is clamped and will act as a keel to prevent turning of the line or leader about its longitudinal axis to thus prevent undesirable twisting of a fishing line.

Various other objects and advantages of the invention will hereinafter become more fully apparent from the following description and the drawing, providing presently preferred embodiments thereof, and wherein:

Figure 1 is a side elevational view of a preferred form of the holder and dispenser, partly broken away to show certain of the deformable elements contained therein, in elevation and other of said deformable elements in section;

Figure 2 is a cross sectional view thereof taken substantially along a plane as indicated by the line 2—2 of Figure 1;

Figure 3 is an elevational view of a portion of a fishing leader or line showing two of the novel deformable sinkers, in section, clamped thereto;

Figure 4 is a cross sectional view through one of the sinkers, taken substantially along a plane as indicated by the line 4—4 of Figure 3;

Figure 5 is a fragmentary side elevational view of another form of the holder and dispenser, and Figure 6 is an end elevational view thereof.

Referring more specifically to the drawing and first with reference to Figures 1 and 2 thereof, the holder and dispenser as illustrated in these views is designated generally as 8 and preferably comprises an annular or disk-like member composed of two corresponding plies 9 and 10. The disk-like member 8 is shown provided with a central opening 11, so that said disk-like member is of annular form. However, the opening 11 could be omitted, in which case the body member 8 would be of disk form. The body member 8 includes a substantially flat portion 12 which is relatively wide radially and which extends from the opening 11 to adjacent the periphery of the body member and which is formed by substantially flat abutting portions of the plies 9 and 10. Said plies 9 and 10 have peripheral portions 9a and 10a which are flared outwardly with respect to one another and which combine with one another to form a groove 13 which opens outwardly of the periphery of the body member 8 completely about the circumference thereof, and which groove is of substantially V-shape in cross section. The plies 9 and 10 may have the portions thereof forming the annular flat part 12 secured together in any suitable manner. Said plies 9 and 10 may be formed of any suitable material capable of being readily flexed or deformed, such as a plastic material or a rubber composition, and which is sufficiently stiff so that the flared peripheral portions 9a and 10a are normally maintained in their positions relatively to one another as illustrated in Figure 2.

A plurality of deformable elements 14 are mounted removably in the groove 13 in circumferentially spaced apart relation to one another after being bent into the form shown in Figs. 1 and 2. The elements 14 are then of substantially V-shape in cross section and are each provided with a longitudinally extending groove 15 also of substantially V-shape cross section. The deformable elements 14 fit snugly in the groove 13 between portions of the flared flanges 9a and 10a and are releasably retained in the groove by frictional engagement with said flanges. The deformable elements 14 are preferably slightly wider than the normal width of the groove 13 so that the portions of the flanges 9a and 10a engaged thereby are deflected outwardly with respect to one another, so that said flange portions will have a sufficient gripping engagement with the deformable elements to retain said elements against casual displacement out of the groove 13.

When it is desired to apply one or more of the deformable elements 14 on to a strand element 16, such as a fishing leader or line, a portion of the strand 16 is inserted into the groove 15 of one of the elements 14 which is contained in the holder groove 13. While so disposed, as illustrated in Figures 1 and 2, the flange portions 9a and 10a, between which said deformable element 14 is disposed, are tightly gripped between the thumb and index finger for displacing said flange portions toward one another to thereby deform the element 14 from its normal open shape as seen in Figure 2 to its deformed shape as seen in Figure 4 and wherein its groove is substantially restricted and the open enlarged part thereof is substantially closed, as seen at 15a in Figure 4, for effectively clamping the deformable element 14 on the strand 16 to form a sinker. Obviously, the strand 16 may be positioned in engagement with the grooves 15 of several of the deformable elements 14 and said elements 14 may be successively clamped to the strand 16 by gripping pressures exerted on different circumferentially spaced parts of the flanges 9a and 10a. After one or more of the sinkers 14 has thus been clamped to the strand 16, the strand and holder 8 may be pulled away from one another for dislodging the sinkers 14 which are clamped to the strand 16 from the groove 13. It will be obvious that the deformable elements 14 may be re-opened or spread after use for removal thereof from the strand 16 and for causing the used deformable element or elements 14 to resume their open shape as seen in Figure 2. Said deformable elements may then be reapplied to the groove 13, if desired, to be held by and re-used in conjunction with the holder 8.

As seen in Figure 4, it will be noted that the deformable elements are originally of substantially disk form and are then folded in half approximately diametrically thereof. The strand 16 engages in the bed of the groove 15, as seen in Figure 4, adjacent the fold 17 of the element 14. Accordingly, the major part of the sinker 14 and the preponderance of the weight thereof is spaced laterally from the strand 16 on the opposite side thereof from the fold line 17. This sinker part 14a forms a keel which will depend from the line or leader 16 when in use, as seen in Figures 3 and 4, to prevent the line or leader from turning about its longitudinal axis and becoming untwisted or excessively twisted. The depending keel portion 14a has rounded ends 14b, as seen in Figure 4, which will minimize the possibility of the sinker snagging on obstructions while the strand 16 is being drawn through the water.

Figures 5 and 6 illustrate another form of the holder and dispenser, designated generally 18, and shown as constituting an elongated strip of two ply construction composed of corresponding plies 19 and 20 having longitudinally extending intermediate portions disposed in abutting engagement and suitably secured together as seen at 21 and longitudinal edge portions 19a and 20a, respectively, which are flared outwardly relative to one another. The complementary longitudinal edge portions 19a and 20a form grooves 22 of substantially V-shape in cross section. The plies 19 and 20 may be formed of a material corresponding to the material of which the plies 9 and 10 are formed and so that the complementary flared edge portions 19a and 20a will function in the same manner as the flared peripheral edges 9a and 10a, as previously described. Each of the grooves 22 is adapted to support a plurality of deformable elements 23, corresponding to the elements 14, which are frictionally engaged by the edge portions 19a and 20a. The longitudinal edge portions 19a and 20a may be provided with lips 19b and 20b, as seen in Figure 6, to overlie the outer edges of the deformable elements 23 for more effectively retaining said elements 23 in the grooves 22. The lips 19b and 20b can be readily flexed outwardly to remove the deformable elements from the grooves 22. The peripheral portions 9a and 10a may also be provided with similar lips, if desired.

It will be obvious that a line or leader or strand element such as the element 16 may be inserted in selected ones of the grooves of the deformable element 23, after which such element or elements may be deformed by a pressure on the edge portions 19a and 20a, between which the deformable element is disposed for clamping said element to a strand in the same manner as previously described and as illustrated in Figures 1 and 2.

Various other modifications and changes are contemplated and may obviously be resorted to, without departing from the spirit or scope of the invention as hereinafter defined by the appended claims.

I claim as my invention:

1. A device of the character described comprising a holder having parts cooperating to define an outwardly opening groove, a deformable element fitting snugly in said groove and releasably retained therein by engagement with the groove forming holder parts, said deformable element having an outwardly opening strand receiving groove, and a strand element having a part disposed within said strand receiving groove, said groove forming holder parts being displaceable toward one another by a compressive force for deforming said element for clamping the strand in the groove thereof, and said deformed element being disengageable from the holder groove by pulling forces exerted on the holder and strand in opposite directions, said groove forming parts of the holder having inturned lips extending into the open outer part of the groove and engaging outer edge portions of the deformable element, said inturned lips being capable of flexing outwardly for releasing the deformable element from the groove.

2. A device of the character described comprising a holder consisting of a pair of sheet-like elements having complementary portions secured together in face adjacency and other complementary edge portions disposed in outwardly flared relation to one another, said edge portions defining an outwardly opening groove; a deformable element fitting snugly in said groove and releasably retained therein by frictional engagement with said flared edge portions, said deformable element having an outwardly opening groove, and a strand element having a part disposed within the groove of said deformable element, said edge portions being displaceable toward one another by compressive forces for deforming said element to clamp the strand in the groove thereof, and said deformed element being displaceable from the holder groove by pulling forces exerted on the holder and strand in opposite directions.

3. A device as in claim 2, said sheet-like elements being disc-shaped and said edge portions constituting peripheral portions thereof.

References Cited in the file of this patent

UNITED STATES PATENTS

| 1,557,771 | Peckinpaugh | Oct. 20, 1925 |
| 2,085,096 | Hansen | June 29, 1937 |
| 2,116,547 | Sundback | May 10, 1938 |
| 2,603,992 | Brown et al. | July 22, 1952 |
| 2,651,958 | Deline | Sept. 15, 1953 |

FOREIGN PATENTS

| 709,822 | Great Britain | June 2, 1954 |